(12) United States Patent
Russegger et al.

(10) Patent No.: US 8,175,446 B2
(45) Date of Patent: *May 8, 2012

(54) HOT RUNNER NOZZLE HEATER AND METHODS OF MANUFACTURE THEREOF

(75) Inventors: Elias Russegger, Golling (AT);
Gerhard Schefbänker, Golling (AT);
Gernot Antosch, Hallein (AT);
Wolfgang Pöschl, Abtenau (AT);
Christopher C. Lanham, O'Fallon, MO (US); James McMillin, Algonquin, IL (US); William A. McDowell, III, Aurora, IL (US); Kenneth F. Fennewald, Maryland Heights, MI (US); Allen Boldt, Kirkwood, MI (US); Frederic Zimmermann, Frankenberg (DE); Reinhardt Lehnert, Ubstadt-Weiher (DE); Kevin Ptasienski, O'Fallon, MI (US)

(73) Assignee: Wallow Electric Manufacturing Company, St.Loius, MO (US)

( * ) Notice: Subject to any disclaimer, the term of this patent is extended or adjusted under 35 U.S.C. 154(b) by 682 days.

This patent is subject to a terminal disclaimer.

(21) Appl. No.: 11/850,447

(22) Filed: Sep. 5, 2007

(65) Prior Publication Data
US 2008/0138053 A1 Jun. 12, 2008

Related U.S. Application Data

(63) Continuation of application No. 11/252,198, filed on Oct. 17, 2005, now Pat. No. 7,280,750.

(51) Int. Cl.
*B05B 1/24* (2006.01)
*F16K 49/00* (2006.01)

(52) U.S. Cl. .................... 392/473; 137/334
(58) Field of Classification Search .......... 392/465–503; 137/334–341
See application file for complete search history.

(56) References Cited

U.S. PATENT DOCUMENTS

| | | | |
|---|---|---|---|
| 5,504,304 A | 4/1996 | Noguchi et al. | |
| 5,569,474 A | 10/1996 | Kitaichi et al. | |
| 5,705,793 A | 1/1998 | Kitaichi et al. | |
| 5,973,296 A | 10/1999 | Juliano et al. | |
| 6,305,923 B1 | 10/2001 | Godwin et al. | |
| 6,762,396 B2 | 7/2004 | Abbott et al. | |
| 6,780,003 B2 * | 8/2004 | Sicilia et al. | 425/549 |
| 6,797,925 B1 | 9/2004 | Gunther et al. | |
| 6,919,543 B2 | 7/2005 | Abbott et al. | |
| 7,071,449 B2 * | 7/2006 | Godwin et al. | 219/426 |

(Continued)

FOREIGN PATENT DOCUMENTS
EP 0 312 029 A1 4/1989
(Continued)

*Primary Examiner* — Daniel L Robinson
(74) *Attorney, Agent, or Firm* — Brinks Hofer Gilson & Lione

(57) ABSTRACT

An instrumented heater sleeve is provided that has a plurality of zones, a dielectric layer disposed over an outer surface of the sleeve, a resistive element layer disposed over the first dielectric layer, and a plurality of pairs of lead wires secured to a portion of the resistive element layer. Each pair of lead wires is connected to and corresponds with each of the zones and a protective layer is disposed over the dielectric layer. An amount of power is supplied to each of the zones and adjusted during a test run, or multiple test runs, to achieve a desired temperature profile along a heating target such as a hot runner nozzle. Methods of designing a hot runner nozzle heater using the instrumented heater sleeve are also provided.

16 Claims, 14 Drawing Sheets

U.S. PATENT DOCUMENTS

| | | |
|---|---|---|
| 7,137,806 B2 | 11/2006 | Babin et al. |
| 2002/0054933 A1 | 5/2002 | Gellert et al. |
| 2005/0025470 A1 | 2/2005 | Russegger |
| 2005/0109767 A1 | 5/2005 | Fennewald et al. |
| 2005/0145616 A1 | 7/2005 | Ptasienski et al. |
| 2005/0145617 A1 | 7/2005 | McMillin et al. |
| 2005/0181090 A1 | 8/2005 | Olaru |
| 2005/0199610 A1 | 9/2005 | Ptasienski et al. |
| 2006/0219709 A1* | 10/2006 | Kagan .......................... 219/661 |
| 2006/0269641 A1* | 11/2006 | Atwood et al. ............... 425/286 |

FOREIGN PATENT DOCUMENTS

| | | |
|---|---|---|
| EP | 0 653 283 | 5/1995 |
| FR | 2 770 078 | 4/1999 |
| WO | WO 01/98054 | 12/2001 |
| WO | WO 02/32190 | 4/2002 |

* cited by examiner

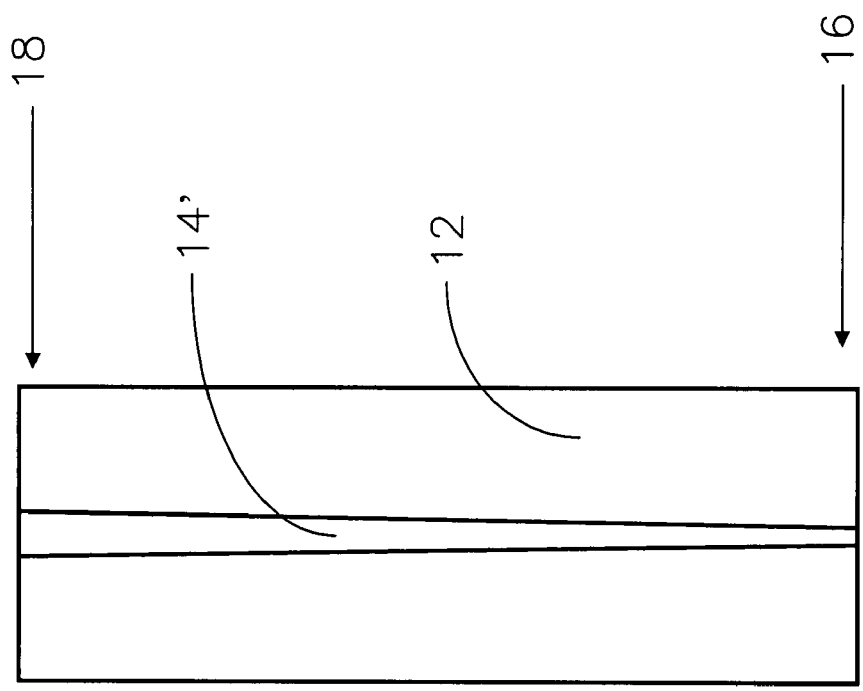
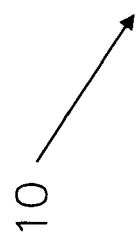
FIG. 10

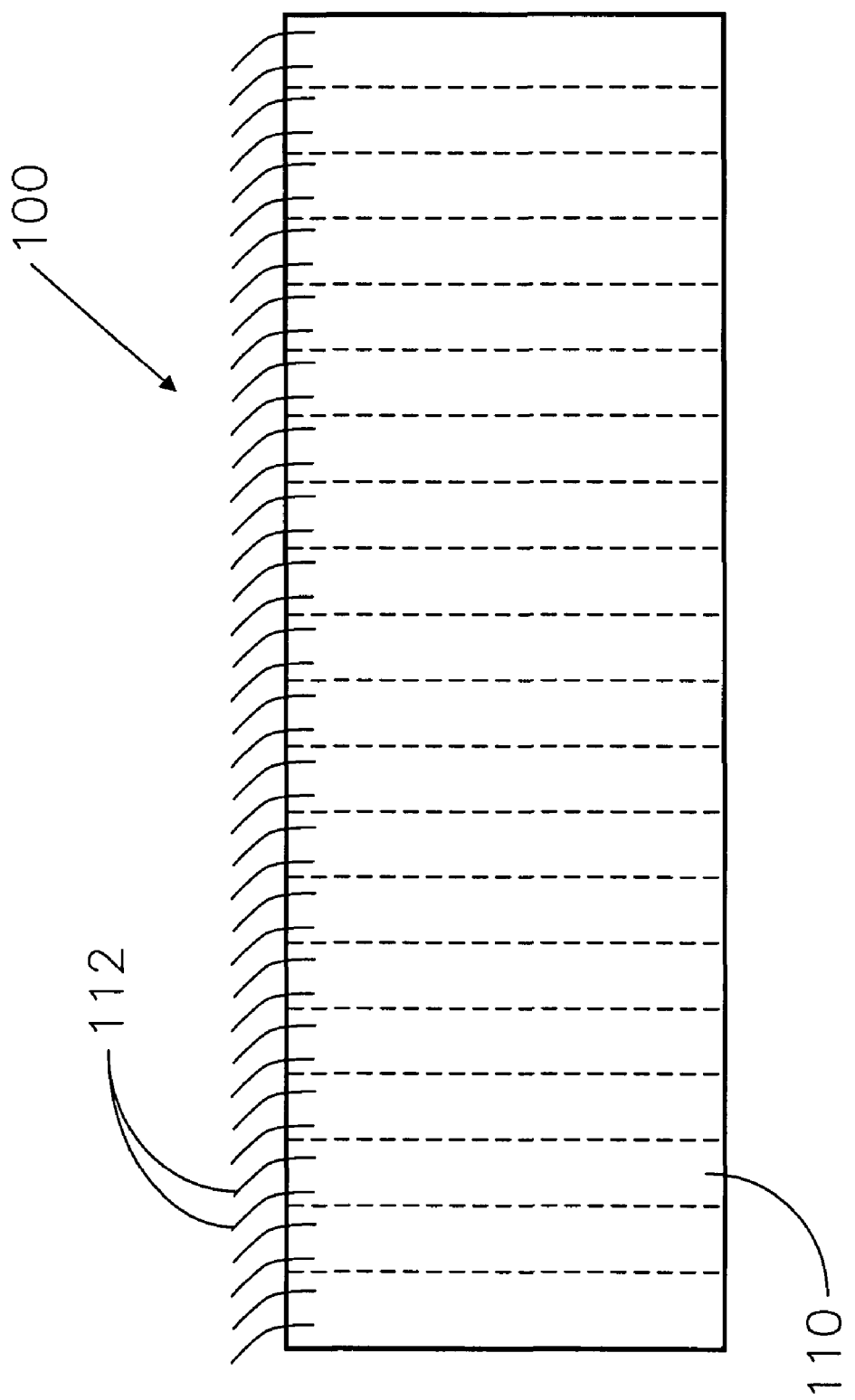

HOT RUNNER NOZZLE HEATER AND METHODS OF MANUFACTURE THEREOF

CROSS-REFERENCE TO RELATED APPLICATIONS

This application is continuation of U.S. patent application Ser. No. 11/252,198, filed on Oct. 17, 2005. The disclosure of the above application is incorporated herein by reference.

FIELD

The present invention relates generally to electrical heaters and more particularly to layered film heaters for use in hot runner nozzle applications in injection molding equipment.

BACKGROUND

The statements in this section merely provide background information related to the present disclosure and may not constitute prior art.

Layered heaters are typically used in applications where space is limited, where heat output needs vary across a surface, where rapid thermal response is desired, or in ultra-clean applications where moisture or other contaminants can migrate into conventional heaters. A layered heater generally comprises layers of different materials, namely, a dielectric and a resistive material, which are applied to a substrate. The dielectric material is applied first to the substrate and provides electrical isolation between the substrate and the electrically-live resistive material and also reduces current leakage to ground during operation. The resistive material is disposed on the dielectric material in a predetermined pattern and provides a resistive heater circuit. The layered heater also includes leads that connect the resistive heater circuit to an electrical power source, which is typically cycled by a temperature controller. The lead-to-resistive circuit interface is also typically protected both mechanically and electrically from extraneous contact by providing strain relief and electrical isolation through a protective layer. Accordingly, layered heaters can be highly customizable for a variety of heating applications.

Layered heaters may be "thick" film, "thin" film, or "thermally sprayed," among other types, wherein the primary difference between these types of layered heaters is the method in which the layers are formed. For example, the layers for thick film heaters are typically formed using processes such as screen printing, decal application, or film dispensing heads, among others. The layers for thin film heaters are typically formed using deposition processes such as ion plating, sputtering, chemical vapor deposition (CVD), and physical vapor deposition (PVD), among others. Yet another series of processes distinct from thin and thick film techniques are those known as thermal spraying processes, which may include by way of example flame spraying, plasma spraying, wire arc spraying, and HVOF (High Velocity Oxygen Fuel), among others.

In hot runner nozzle applications for injection molding equipment, a variety of heaters have been used and are typically disposed around the outer diameter of the hot runner nozzle body. Such heaters have often proven difficult to remove for repair or replacement due to thermal expansion between the hot runner nozzle body and the external heater during operation. Additionally, many hot runner nozzle heaters have been time consuming and costly to produce, in addition to demonstrating certain inefficiencies in providing the requisite temperature profiles along the length of the hot runner nozzle throughout a variety of different processing environments.

SUMMARY

The present disclosure generally provides an instrumented heater sleeve and a method of designing a hot runner nozzle heater by placing said instrumented heater sleeve onto a hot runner nozzle body. The instrumented heater sleeve comprises a sleeve having a plurality of zones; a first dielectric layer disposed over an outer surface of the sleeve; a resistive element layer disposed over the first dielectric layer; and a plurality of pairs of lead wires secured to a portion of the resistive element layer, where each pair of lead wires is connected to and corresponds with each of the zones. The amount of power supplied to each of the zones is adjusted during a test run, or multiple test runs, to achieve a desired temperature profile along a heating target. The instrumented heater sleeve may further comprise a second dielectric layer disposed over the resistive element layer and a protective layer disposed over the second dielectric layer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 10 is a top view of an alternate embodiment of a slot for the hot runner nozzle heater and constructed in accordance with the principles of the present disclosure;

FIG. 14 is a side view of an instrumented heater sleeve constructed in accordance with the principles of the present disclosure.

Corresponding reference numerals indicate corresponding parts throughout the several views of the drawings.

DETAILED DESCRIPTION

The following description of the preferred embodiments is merely exemplary in nature and is in no way intended to limit the disclosure, its application, or uses.

Figure 1:
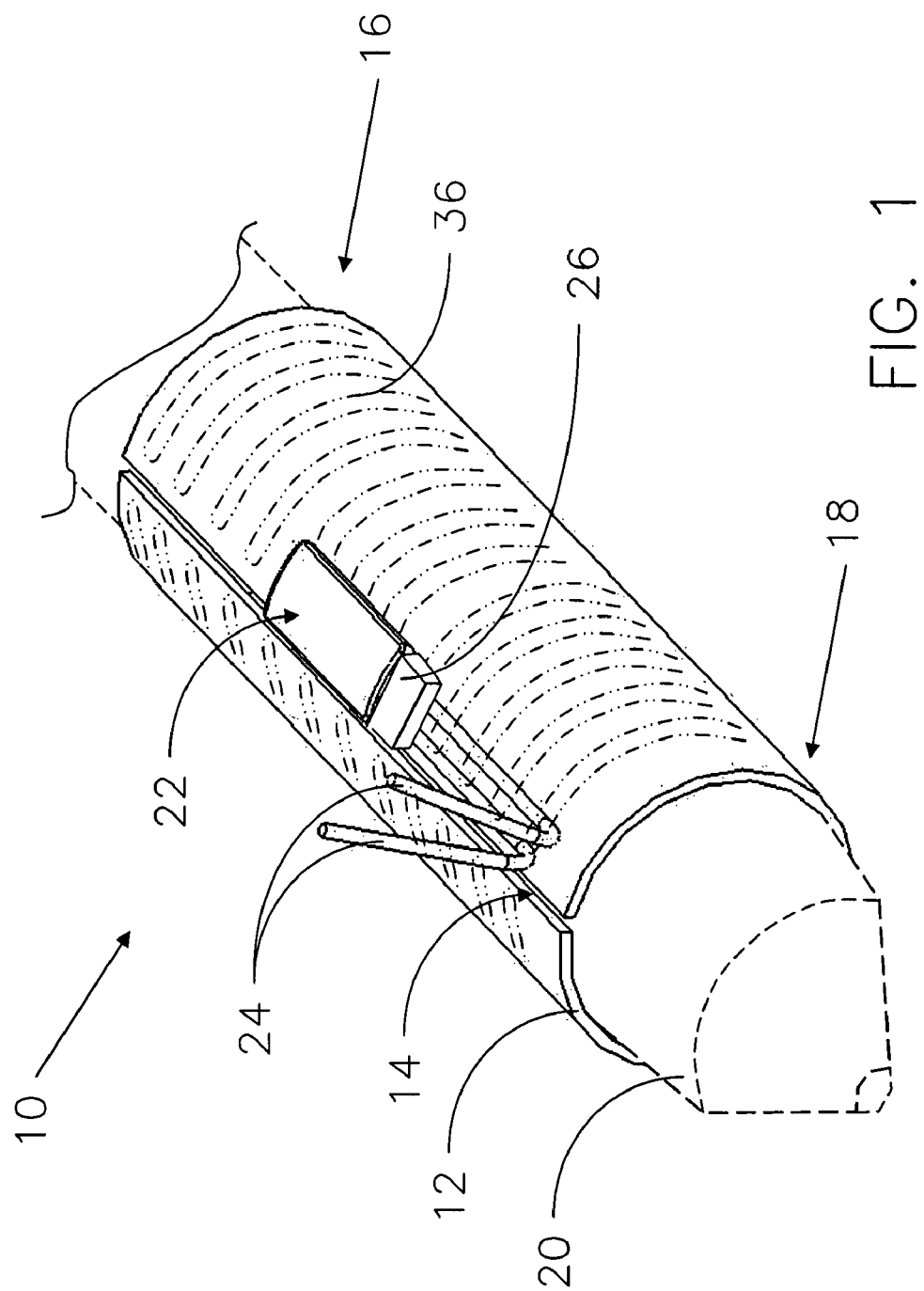
FIG. 1 is a perspective view of a hot runner nozzle heater constructed in accordance with the principles of the present disclosure.
Figure 2:
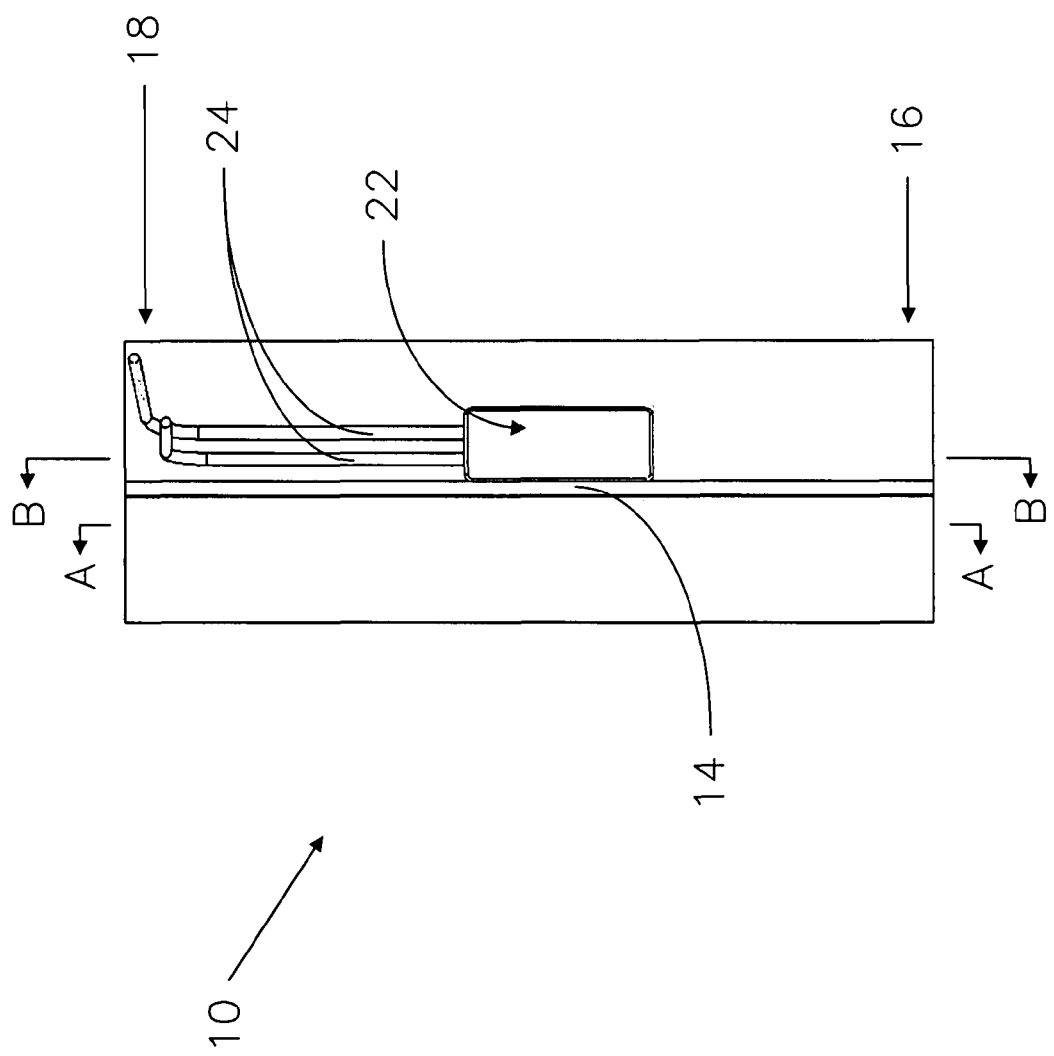
FIG. 2 is a top view of the hot runner nozzle heater of FIG. 1 in accordance with the principles of the present disclosure.
Figure 3:
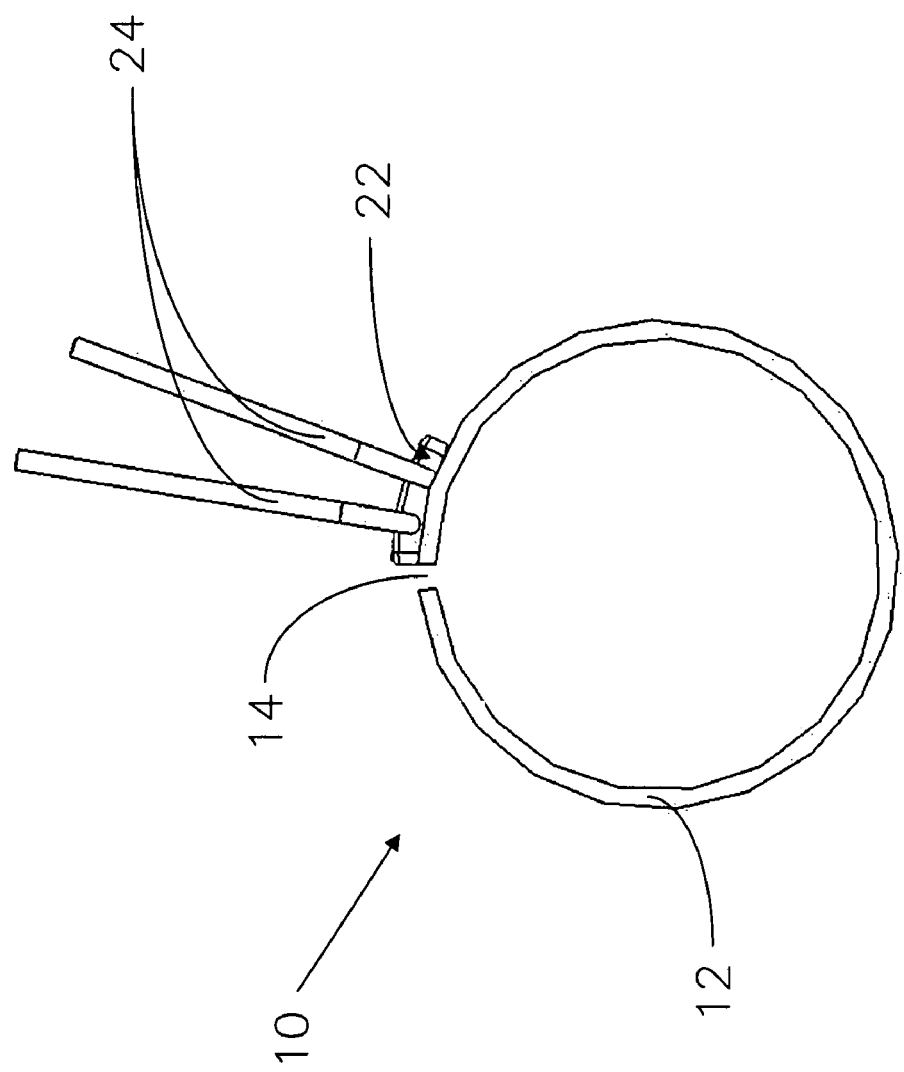
FIG. 3 is a front view of the hot runner nozzle heater of FIG. 1 in accordance with the principles of the present disclosure.

Referring to FIGS. 1-3, a hot runner nozzle heater in accordance with the present disclosure is illustrated and generally indicated by reference numeral 10. The hot runner nozzle heater 10 is preferably a layered heater and thus comprises a plurality of layers as described in greater detail below. As shown, the hot runner nozzle heater 10 in one form comprises a sleeve 12 defining a split-sleeve configuration, wherein the split in this specific embodiment is a slot 14 that extends along the length of the sleeve 12, from a proximal end 16 to a distal end 18. The hot runner nozzle heater 10 is specifically configured for placement around a cylindrical body such as a hot runner nozzle 20 (shown dashed) for injection molding equipment. Alternately, the hot runner nozzle heater 10 may comprise a geometry other than a cylindrical sleeve as shown, such as an ellipse or other polygonal shape, while remaining within the scope of the present invention. Accordingly, the specific cylindrical sleeve geometry should not be construed as limiting the scope of the present invention.

As further shown, the hot runner nozzle heater 10 comprises a termination area 22 with a pair of lead wires 24 extending therefrom. Preferably, the termination area 22 is positioned proximate the slot 14 as shown and away from the proximal end 16 and the distal end 18. In this specific embodiment, the termination area 22 is centered, however, it should be understood that the termination area 22 may be positioned off-center, yet still away from the proximal end 16 and the distal end 18, while remaining within the scope of the present invention. Since the proximal end 16 and the distal end 18 typically experience higher heat loads due to heat sinks of the hot runner nozzle 20, the termination area 22 is positioned away from these heat sinks to make more efficient use of the available area of the overall hot runner nozzle heater 10.

Although the lead wires 24 are shown extending along the length of the hot runner nozzle heater 10, the lead wires 24 may alternately exit the termination area 22 in another location and/or extend along another direction, e.g. 90° to the direction as illustrated. Therefore, the specific configuration of lead wires 24 as shown should not be construed as limiting the scope of the present invention. Additionally, a strain relief 26 is preferably secured to the sleeve 12 proximate the termination area 22 as shown. The lead wires 24 are crimped within the strain relief 26 to reduce the amount of strain transferred to the physical connection between the lead wires 24 and the hot runner nozzle heater 10, which is described in greater detail below. It should be understood that the strain relief 26 may take on a variety of forms, and the embodiment illustrated and described herein should not be construed as limiting the scope of the present invention as other types of strain reliefs may be employed while remaining within the scope of the present invention.

Figure 4:
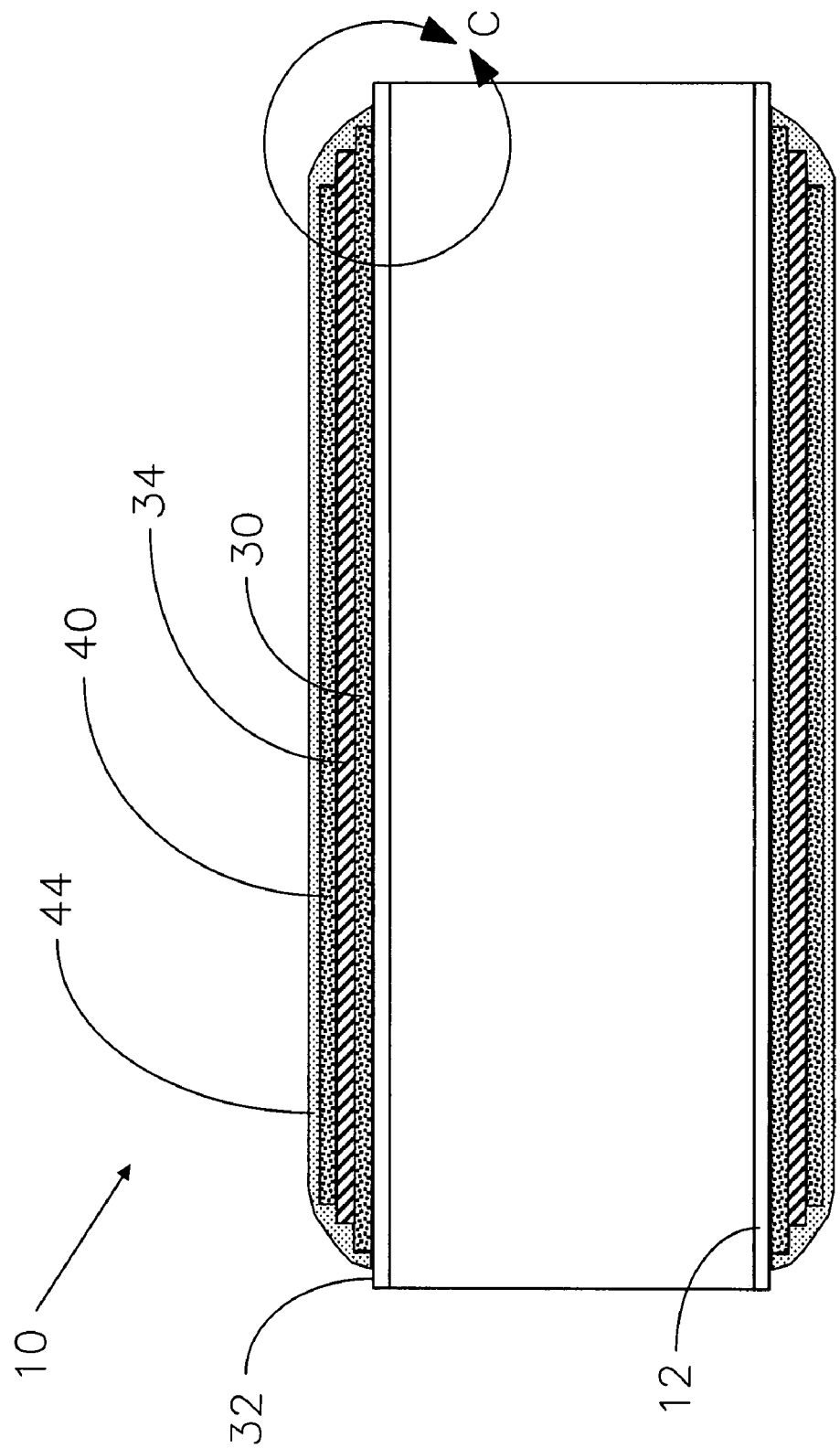
FIG. 4 is a longitudinal cross-sectional view, taken along line A-A of FIG. 2, illustrating the layers of the hot runner nozzle heater and constructed in accordance with the principles of the present disclosure.
Figure 5:
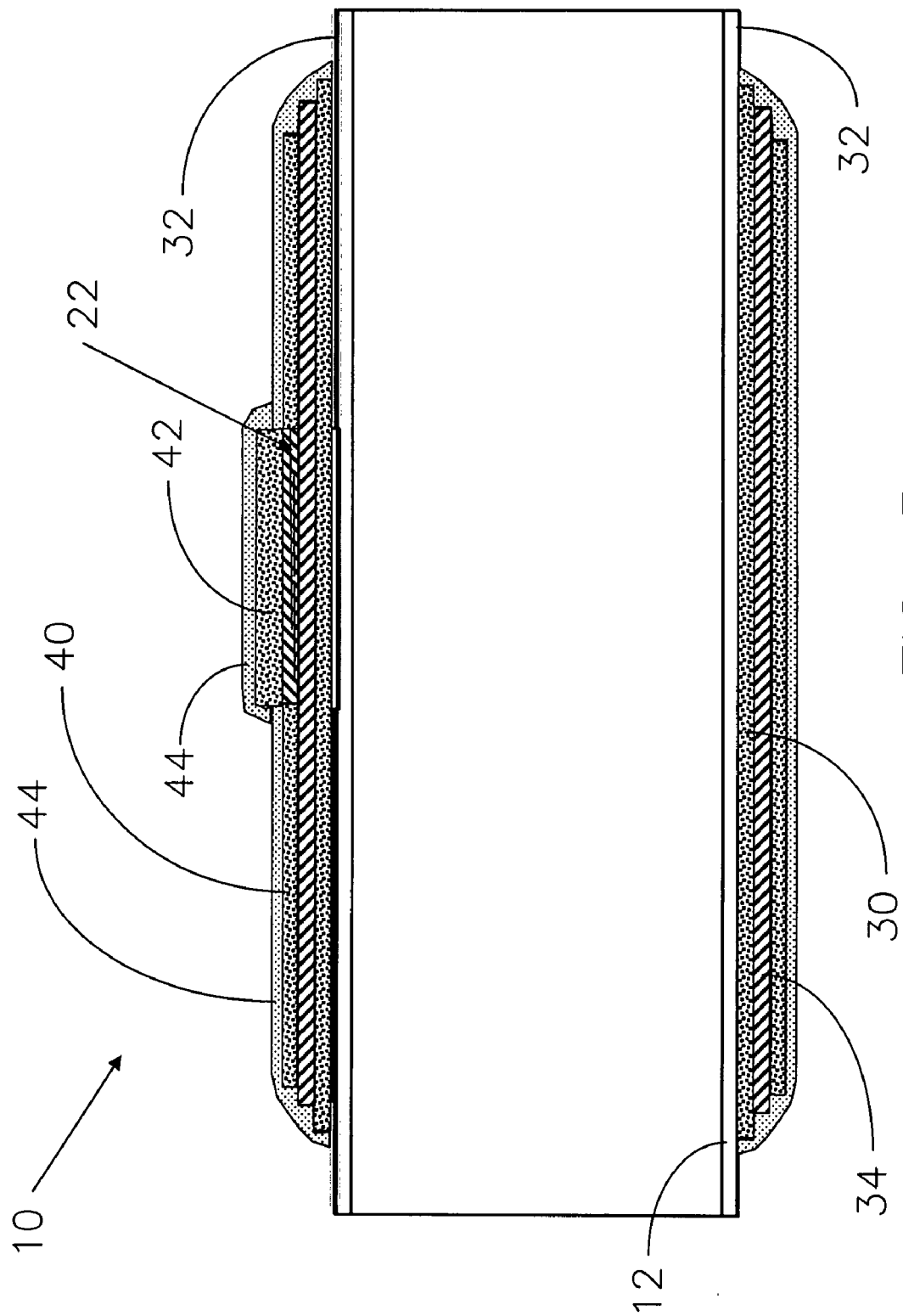
FIG. 5 is a longitudinal cross-sectional view, taken along line B-B of FIG. 2, illustrating the layers and the termination area of the hot runner nozzle heater and constructed in accordance with the teachings of the present disclosure.

Referring now to FIGS. 4 and 5, the hot runner nozzle heater 10 comprises a plurality of different layers. As shown, a first dielectric layer 30 is disposed over the outer surface 32 of the sleeve 12. A resistive element layer 34 is disposed over the first dielectric layer 30. The resistive element layer 34 defines a resistive circuit pattern 36 (shown in phantom in FIG. 1), which is preferably formed using a laser trimming process as shown and described in co-pending application Ser. No. 10/872,752, titled "Method for the Production of an Electrically Conductive Resistive Layer and Heating and/or Cooling Device," filed Jun. 21, 2004, which is commonly assigned with the present application and the contents of which are incorporated herein by reference in their entirety.

As further shown, the hot runner nozzle heater 10 also comprises a second dielectric layer 40 disposed over the resistive element layer 34, but not over the termination area 22. A third dielectric layer 42 is disposed over the termination area 22, and preferably, a protective layer 44 is disposed over the second dielectric layer 40 and the third dielectric layer 42. Each of the dielectric layers 30, 40, and 42, in addition to the resistive element layer 34, are preferably formed using a thermal spray process, and more specifically an air plasma spraying process in one form as described in greater detail below. Therefore, the protective layer 44 is preferably employed as a moisture barrier or inhibiter to seal or further close the pores of the different layers, in addition to further protection of these layers. As described in greater detail below, the protective layer 44 is subjected to thermal treatment after its application to the hot runner nozzle heater 10 to further seal or close the pores.

The materials for each of the layers may vary widely, as long as they function for their intended purpose. Thus materials for the dielectric layers 30, 40, 42 must be electrically isolating and may include, by way of example, a variety of ceramic materials. The resistive element layer 34 is an electrically conductive material, and the material for the protective layer 44 is capable of being applied and thermally treated to seal the pores of the other layers. For example, the protective layer in one form is a metal such as a copper/silver/zinc alloy. Additionally, the substrate 12 in one form is a ferritic stainless steel material, but may be another material so long as it is capable of transferring the heat generated by the resistive element layer 34 to the hot runner nozzle 20.

Figure 6:
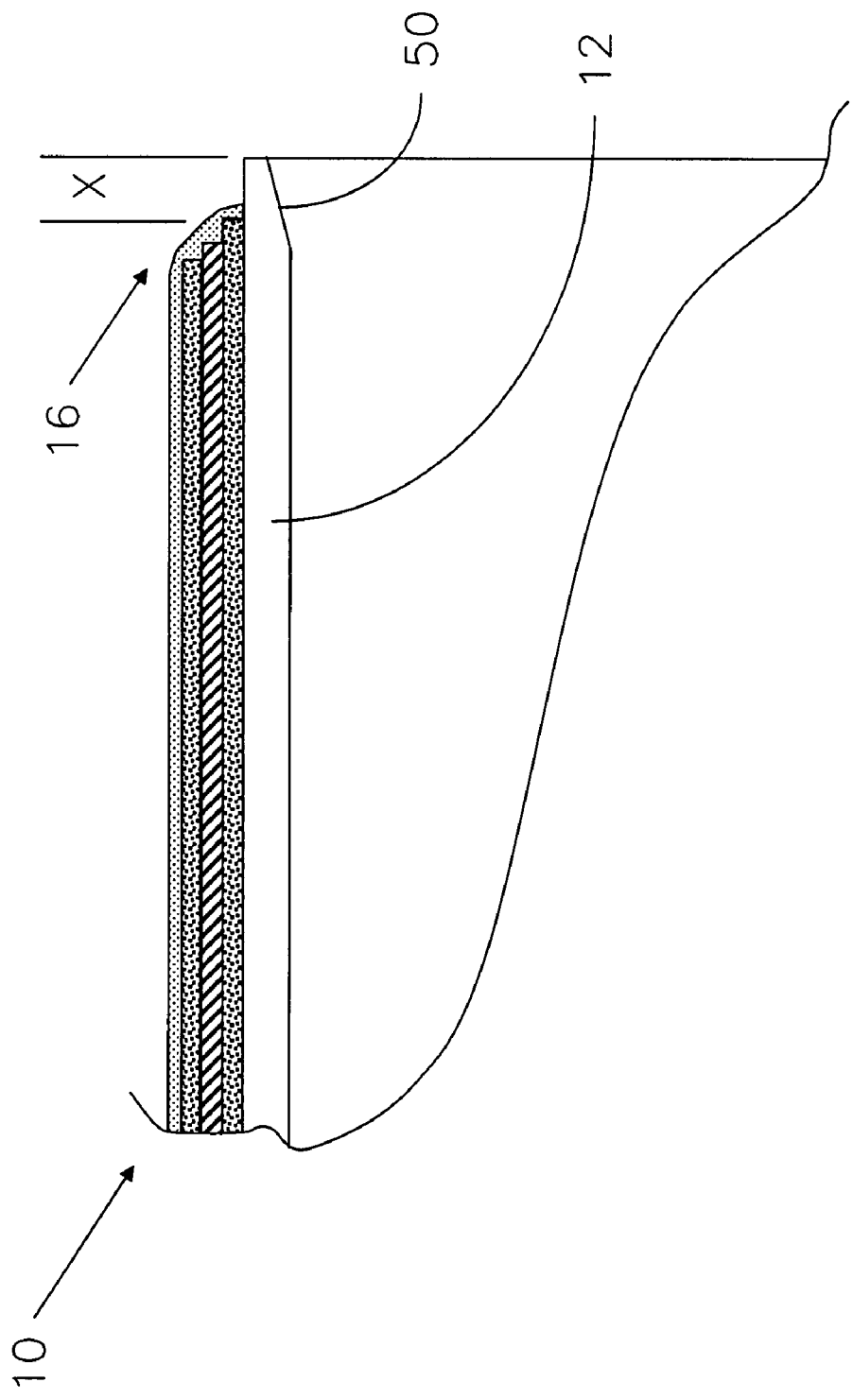
FIG. 6 is an enlarged longitudinal cross-sectional view, within detail C of FIG. 4, illustrating the layers being positioned away from the proximal and distal ends of the hot runner nozzle heater sleeve and constructed in accordance with the principles of the present invention.

As shown in FIG. 6, the layers of the hot runner nozzle heater 10 are preferably positioned a distance X away from the proximal end 16 and the distal end 18 (not shown) although the distance from each end need not be the same. Such a positioning provides protection for the layers of the hot runner nozzle heater 10 during for example, installation and/or removal, where the hot runner nozzle heater 10 may come into abrupt contact with another rigid part such as the hot runner nozzle 20 itself, a manifold (not shown), or if the hot runner nozzle heater 10 is accidentally dropped. As further shown, the hot runner nozzle heater 10 preferably comprises a chamfer 50 disposed near the proximal end 16 to facilitate ease of installation over the hot runner nozzle 20. Alternately, the proximal end 16 of the hot runner nozzle heater 10 may define an internal radius or other feature to facilitate ease of installation while remaining within the scope of the present invention.

Figure 7:
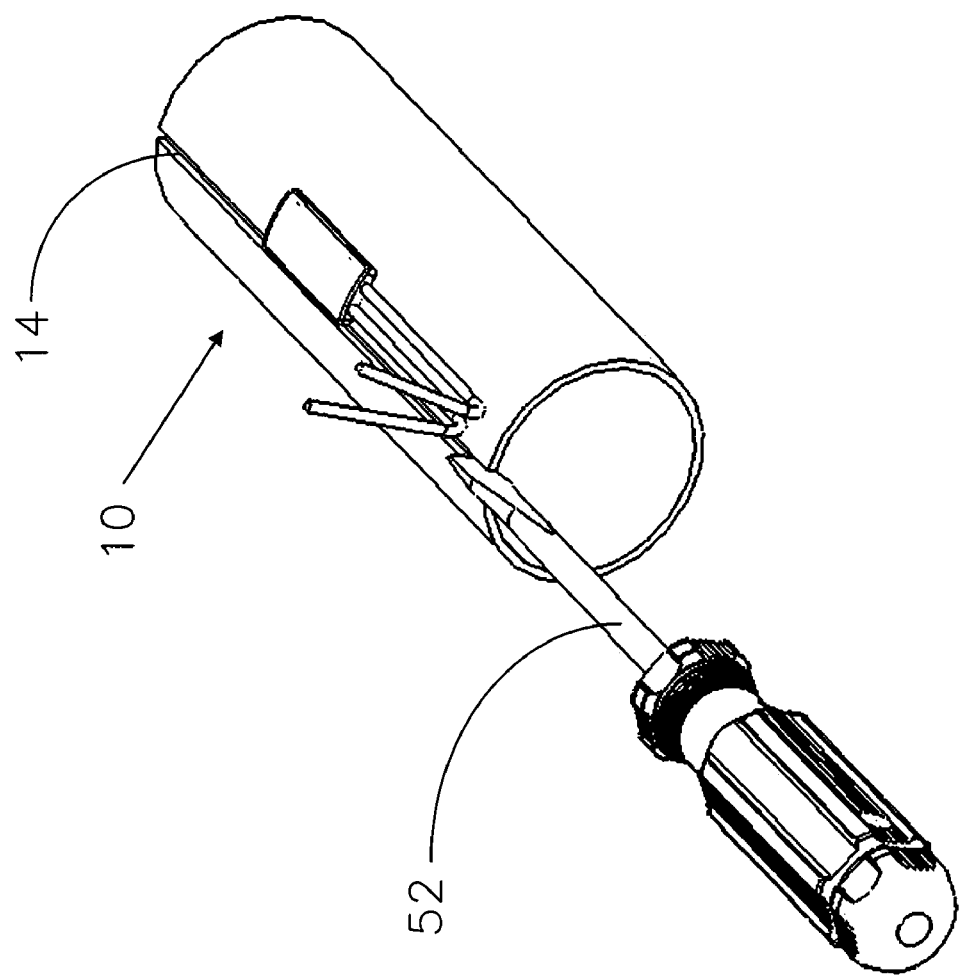
FIG. 7 is a perspective view of a tool, such as a standard screwdriver, engaging a slot of the hot runner nozzle heater for removal from a hot runner nozzle in accordance with the teachings of the present disclosure.

With reference to FIG. 7, some embodiments of the hot runner nozzle heater 10 according to the teachings of the present invention allows for ease of removal from the hot runner nozzle 20 (not shown) with a standard slotted screwdriver 52 or other removal tool. As shown, the tip of the screwdriver 52 is inserted into the slot 14 and turned such that the hot runner nozzle heater 10 is elastically deformed or widened proximate the slot 14 to facilitate removal from the hot runner nozzle 20. Additionally, the hot runner nozzle heater 10 can alternately be designed such that a clamping force is applied to the hot runner nozzle 20 upon installation, thus providing for more intimate contact between the hot runner nozzle heater 10 and the hot runner nozzle 20 for more efficient heat transfer. Therefore, the screwdriver 52 would be used to widen the hot runner nozzle heater 10 upon installation and removal. Due to the operating temperatures of typical hot runner nozzles 20, thermal expansion can create close contact between the hot runner nozzle heater 10 and the hot runner nozzle 20 even without designing in a clamping force. Accordingly, it should be understood that a predetermined clamping force designed into the hot runner nozzle heater 10 should not be construed as limiting the scope of the present invention and that a hot runner nozzle heater 10 without a clamping force is also included within the teachings of the present invention.

Figure 8:
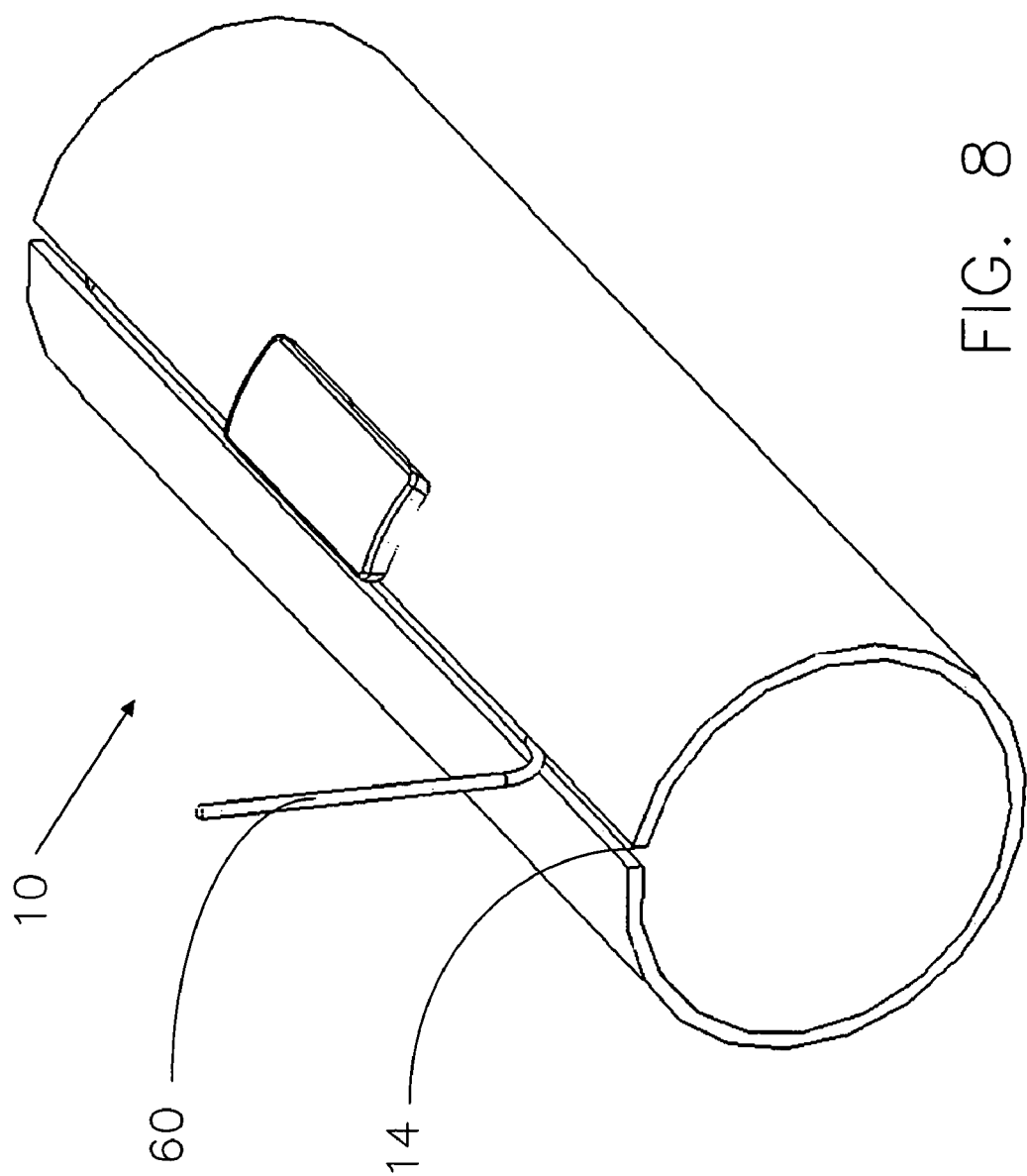
FIG. 8 is a perspective view illustrating a thermocouple disposed within the slot of the hot runner nozzle heater in accordance with the teachings of the present disclosure.

Referring to FIG. 8, in some embodiments the slot 14 is alternately sized to accommodate a thermocouple 60 which can be a pre-existing component of a hot runner nozzle 20 set-up. (The lead wires 24 and the strain relief 26 are not shown for clarity). Alternately, the thermocouple 60 may be provided with the hot runner nozzle heater 10 in accordance with the teachings of the present invention if there is no pre-existing thermocouple. It should be understood that the positioning of the end of the thermocouple 60 exiting the slot 14 is illustrative only and is not intended to limit the scope of the present invention. Accordingly, the slot 14 not only provides for ease of installation and removal, but also serves as a convenient location for placement of a thermocouple 60, if desired, as a part of the overall heating system.

Figure 9:
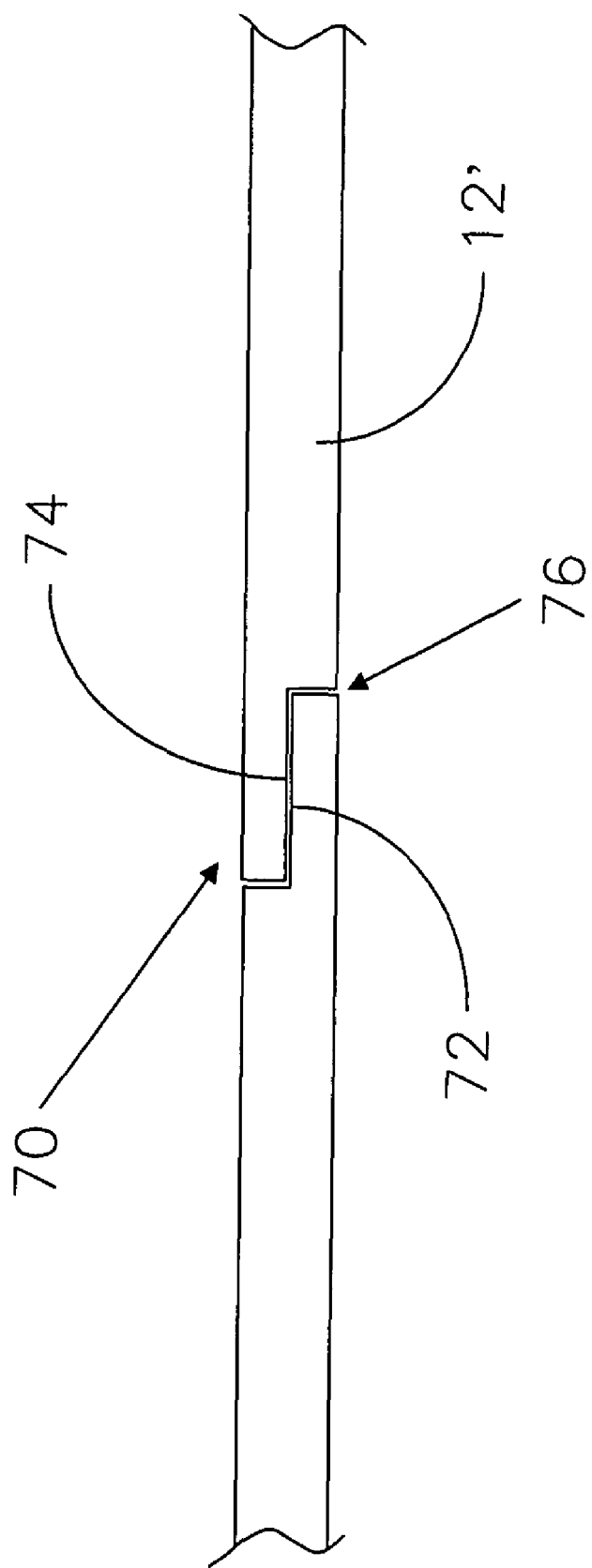
FIG. 9 is a cross-sectional view of an alternate split configuration and constructed in accordance with the principles of the present disclosure.

As illustrated in FIG. 9, in some embodiments the split-sleeve configuration alternately defines a step-lap interface 70 rather than a slot 14 as previously illustrated and described. (The layers and other details are not shown for clarity). The step-lap interface 70 comprises a first step 72 and a second step 74, and a gap 76 between each side of the sleeve 12'. Accordingly, the sleeve 12' is capable of being elastically deformed as previously described, as the gap 76 widened, to facilitate installation and removal of the hot runner nozzle heater 10. It should be understood that the step-lap interface 70 is illustrative only and that other configurations for the split-sleeve 12 that achieve elastic deformation and thus a widening of the split sleeve 12 may be employed while remaining within the scope of the present invention.

FIG. 10 illustrates yet another alternate embodiment of the present invention, wherein the slot 14' defines a non-constant width rather than a relatively constant width as previously illustrated and described. In applications where the length of the overall hot runner nozzle heater 10 is particularly long, it may prove difficult to achieve the proper deformation, or widening, of the split-sleeve 12 in order to remove the hot runner nozzle heater 10. Accordingly, the width of the slot 14' can be wider at the distal end 18 (near the hot runner nozzle tip), where the screwdriver 52 or other tool is used, than at the proximal end 16 (near a manifold of the hot runner nozzle system).

With regard to the split-sleeve heater configurations as illustrated and described herein, it should be understood that the application of such configurations is not limited to a hot runner nozzle application. For example, a layered heater having a split-sleeve configuration may be employed for a variety of heating applications such as fluid conduits or pipes, among many others, while remaining within the scope of the present invention.

Figure 11:
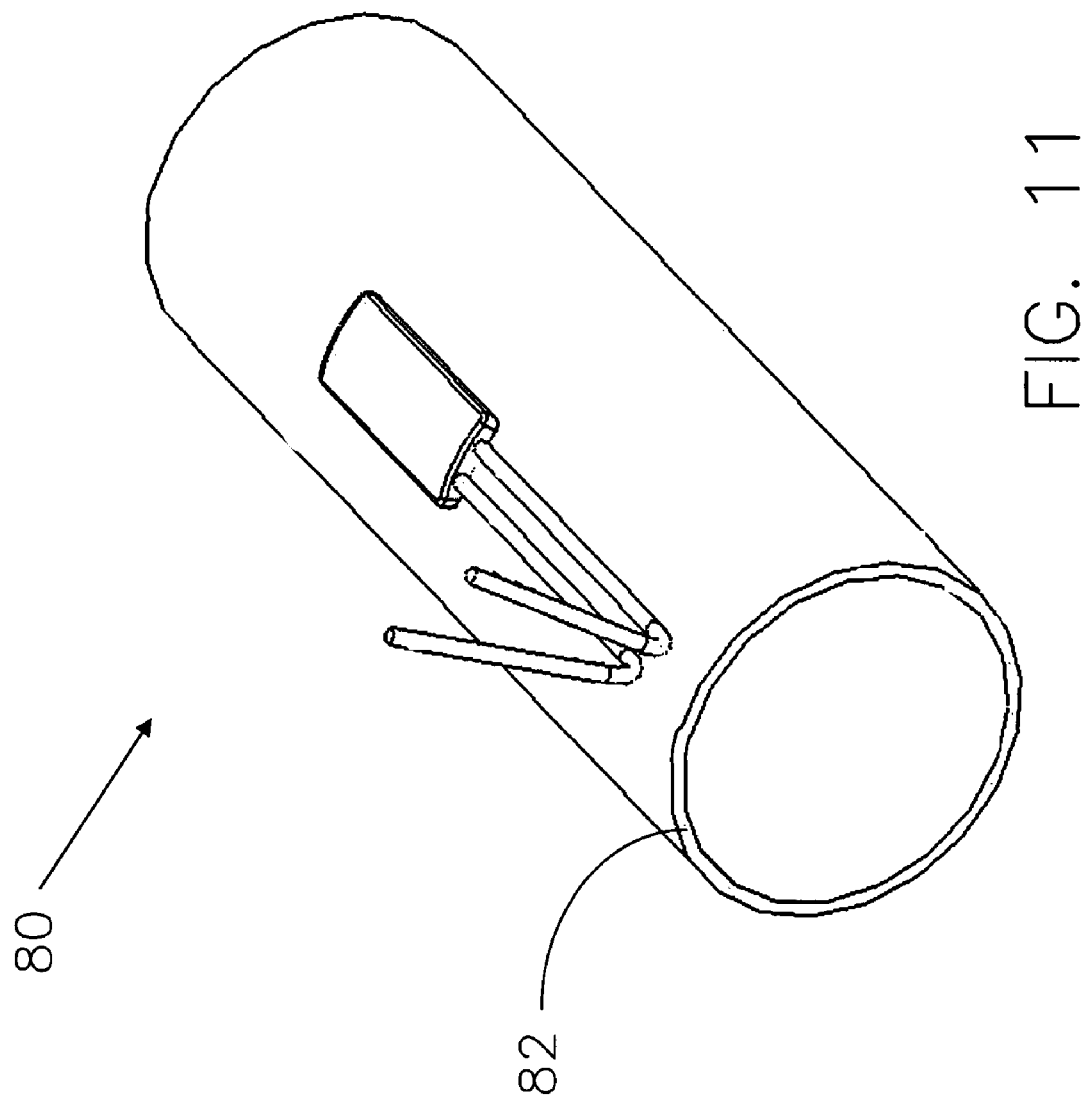
FIG. 11 is a perspective view of another embodiment of a hot runner nozzle heater constructed in accordance with the principles of the present disclosure.
Figure 12:
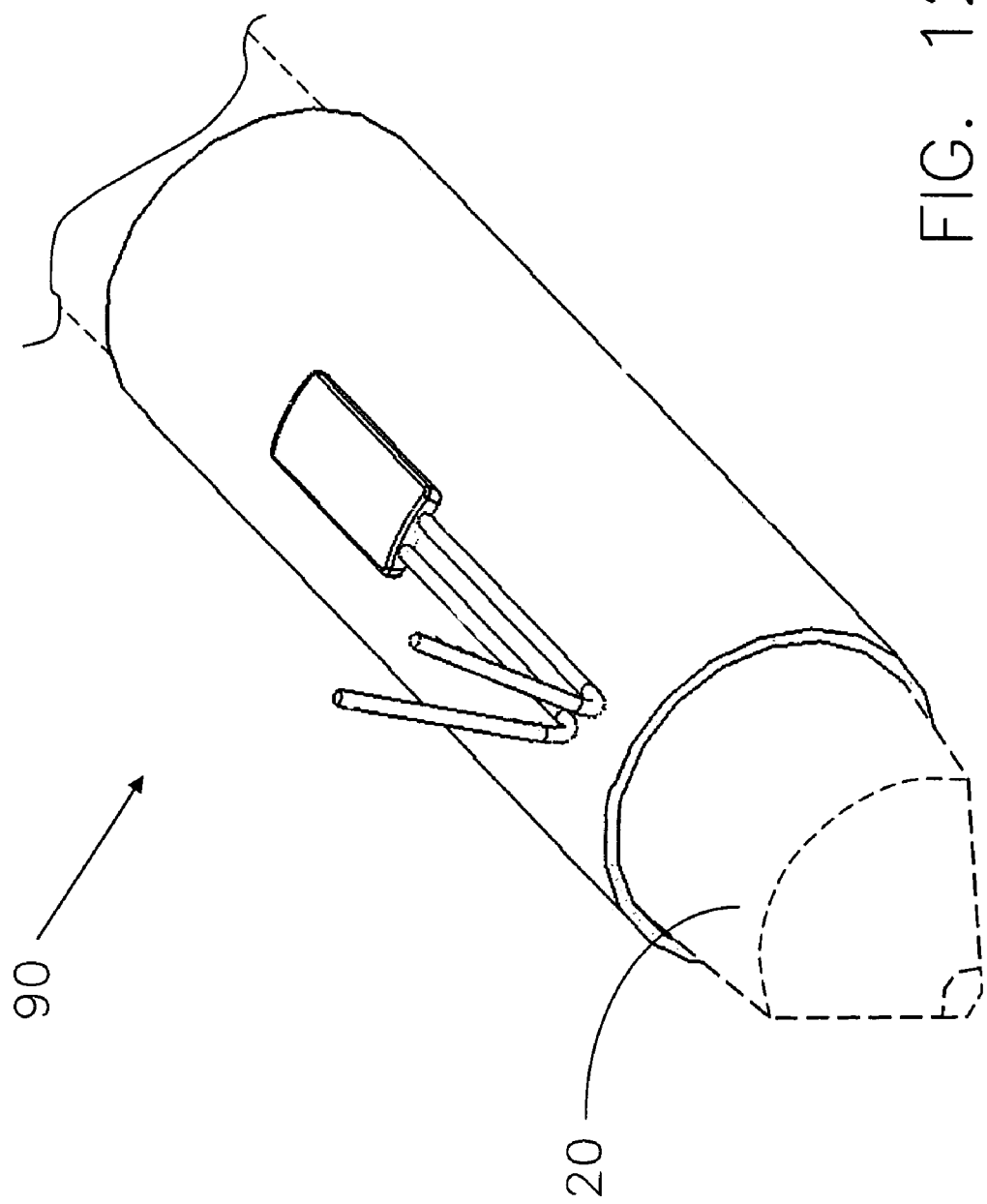
FIG. 12 is a perspective view of yet another embodiment of a hot runner nozzle heater constructed in accordance with the principles of the present disclosure.

Referring now to FIGS. 11 and 12, additional forms of the present invention are illustrated without the split-sleeve configuration as previously illustrated and described. In the embodiment of FIG. 11, a hot runner nozzle heater 80 is shown that comprises a sleeve 82 and layers, along with a termination area, as previously illustrated and described. The resistive circuit for the resistive element layer is specifically formed by laser removal, and the hot runner nozzle heater 80 does not include the slot 14 as previously described. Accordingly, the size, and more particularly the diameter, of the sleeve 82 is dimensioned to facilitate installation and removal. Additionally, removal may be further facilitated through the use of a specific removal tool such as that described in co-pending application Ser. No. 60/662,230 titled "Tool for Removal of a Component," filed Mar. 16, 2005, which is commonly assigned with the present application and the contents of which are incorporated herein by reference in their entirety.

In the embodiment of FIG. 12, the hot runner nozzle heater 90 layers are applied directly to the outer surface of a hot runner nozzle 20 without the need for a separate sleeve. In this embodiment, the layers and termination area are formed and function as previously described, and the resistive circuit for the resistive element layer is specifically formed by laser removal. Accordingly, with this embodiment of a hot runner nozzle heater 90, there is no need for installation and removal of a sleeve as previously described, as the hot runner nozzle heater 90 is an integral part of the hot runner nozzle 20 body.

In both of the hot runner nozzle heaters 80 and 90, the heaters are preferably formed according to the teachings of co-pending application Ser. No. 10/872,752, titled "Method for the Production of an Electrically Conductive Resistive Layer and Heating and/or Cooling Device," filed Jun. 21, 2004, which is commonly assigned with the present application and the contents of which are incorporated herein by reference in their entirety.

Figure 13:
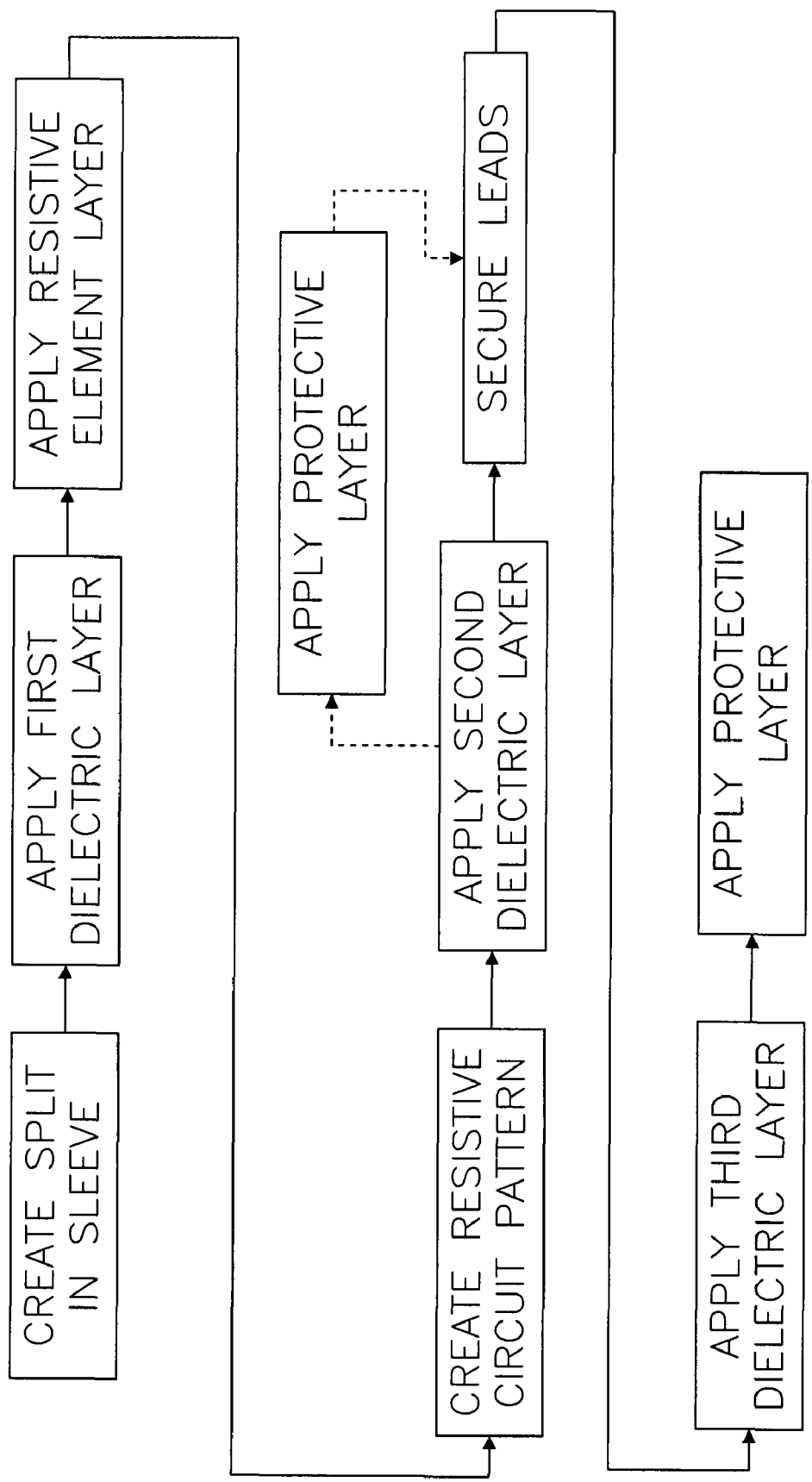
FIG. 13 is a flow diagram illustrating a method in accordance with the teachings of the present disclosure.

According to a method of the present invention, as indicated in block diagram form in FIG. 13, the hot runner nozzle heater 10 is preferably manufactured using thermal spray processes. Initially, a split is created in the sleeve 14 and the sleeve 14 is cleaned and prepared for the application of layers to the outer surface 32. The first dielectric layer 30 is applied to the sleeve 12 using a thermal spray process, which is preferably air plasma spraying. However, it should be understood that other thermal spray processes and/or other layered film processes may be employed while remaining within the scope of the present invention. Such alternate processes are shown and described in greater detail in copending application Ser. No. 10/752,359, titled "Combined Material Layering Technologies for Electric Heaters," filed Jan. 6, 2004, which is commonly assigned with the present application and the contents of which are incorporated herein by reference in their entirety.

Next, the resistive element layer 34 is applied over the first dielectric layer 30 preferably using air plasma spraying. The resistive circuit pattern 36 is then created in the resistive element layer 34 preferably using a laser trimming process. The second dielectric layer 40 is then applied over the resistive element layer 34, preferably using air plasma spraying. The second dielectric layer 40 is not applied over the termination area 22, and thus the termination area 22 is preferably masked during this operation. Then, the terminal leads 24 are attached to the resistive element layer 34, preferably using a thermal spray process such as that disclosed in co-pending application application no. PCT/US2004/039956, titled "Method for the Attachment of an Electrical Lead Wire on a Surface Element, as well as a Heating Element, Especially for a Plastic-Spraying Device," filed Nov. 24, 2004, which is commonly assigned with the present application and the contents of which are incorporated herein by reference in their entirety. During this step, the second dielectric layer 40 is preferably masked.

After the terminal leads 24 are attached to the resistive element layer 34, the third dielectric layer 42 is applied over the termination area 22, and preferably, at least a portion of the second dielectric layer 40 is masked during this step. Then, the protective layer 44 is applied over the second dielectric layer 40 and the third dielectric layer 42. Additionally, the hot runner nozzle heater 10, and more specifically the protective layer 44, is subjected to a thermal treatment to facilitate better sealing of the pores of the protective layer 44.

It should be understood that the specific method steps described above are merely illustrative and that variations in the method steps for forming the hot runner nozzle heater 10 may be employed while remaining within the scope of the present invention. For example, an alternate method according to the present invention comprises applying the first dielectric layer 30, applying the resistive element layer 34 and forming the resistive circuit pattern 36, and applying the second dielectric layer 40 while masking the termination area 22 as previously described. As a variation, a first protective layer is applied over the second dielectric layer 40 before securing the terminal leads 24 to the termination area 22, while the termination area 22 remains masked. After the first protective layer is applied, the terminal leads 24 are then secured to the resistive element layer 34 as previously described. The termination area 22 is then sprayed with the third dielectric layer 40, followed by a second protective layer over the termination area 22. Accordingly, the second protective layer slightly overlaps the first protective layer in this alternate embodiment of the manufacturing methods in accordance with the teachings of the present invention.

Additionally, in one form of the present invention, the strain relief 26 is secured to the sleeve 12 prior to applying any of the layers. The strain relief is preferably laser welded to the sleeve 12, however, other methods such as brazing may also be employed while remaining within the scope of the present invention. After the lead wires 24 are secured to the termination area 22, and the various layers are formed, the lead wires 24 are crimped within the strain relief 26 in one form of the present invention. As previously stated, other forms of strain reliefs may alternately be employed while remaining within the scope of the present invention.

Referring now to FIG. 14, a rapid approach to designing the hot runner nozzle heater 10 according to the teachings of the present invention is provided through the use of an instrumented heater sleeve 100. The instrumented heater sleeve 100 is divided into multiple zones 110 as shown, wherein each zone comprises a pair of lead wires 112 that provide for the application of power to each of the zones. The instrumented heater sleeve 100 is installed onto a hot runner nozzle body (not shown), and the amount of power supplied to each of the zones is adjusted during a test run, or multiple test runs, to achieve a desired temperature profile along the hot runner nozzle. Therefore, a control interface (not shown) is also provided in accordance with the teachings of the present invention. Additionally, in one form, each zone is approximately 0.25 in. (10 mm) in width, however, other widths may be employed according to specific application requirements.

The amount of power supplied to each zone is then used in the design of the hot runner nozzle heater 10. Preferably, the design is determined from a standard library of layered heater designs in order to more rapidly provide a tailored heater solution to an end user, and this selection can be automated and tested by computer.

The description of the invention is merely exemplary in nature and, thus, variations that do not depart from the gist of the invention are intended to be within the scope of the invention. For example, the hot runner nozzle heater as described herein may be employed with a two-wire controller as shown and described in U.S. Pat. No. 7,196,295, titled "Two-Wire Layered Heater System," and also incorporates the teachings of co-pending application Ser. No. 10/872,752, titled "Method for the Production of an Electrically Conductive Resistive Layer and Heating and/or Cooling Device," filed Jun. 21, 2004, both of which are commonly assigned with the present application and the contents of which are incorporated herein by reference in their entirety. Such variations are not to be regarded as a departure from the spirit and scope of the invention.

What is claimed is:

1. An instrumented heater sleeve comprising:
    a sleeve having a plurality of zones;
    a first dielectric layer disposed over an outer surface of the sleeve;
    a resistive element layer disposed over the first dielectric layer;
    a plurality of pairs of lead wires secured to a portion of the resistive element layer, wherein each pair of lead wires is connected to and corresponds with each of the zones;
    a second dielectric layer disposed over the resistive element layer; and
    a protective layer disposed over the second dielectric layer, wherein an amount of power supplied to each of the zones is adjusted during a test run, or multiple test runs, to achieve a desired temperature profile along a heating target.

2. The instrumented heater sleeve according to claim 1, wherein each zone is approximately 0.25 in. (10mm) in width.

3. The instrumented heater sleeve according to claim 1, wherein the sleeve comprises one selected from the group of a slot or a step-lap interface extending along a length of the sleeve.

4. The instrumented heater sleeve according to claim 1 further comprising a control interface.

5. The instrumented heater sleeve according to claim 1, wherein the instrumented heater sleeve further comprises a strain relief secured to the sleeve and in which the lead wires are crimped.

6. The instrumented heater sleeve according to claim 1, wherein the protective layer is a moisture barrier adapted to seal pores in the underlying layers.

7. The instrumented heater sleeve according to claim 1, wherein the sleeve has a shape selected as one from the group of cylindrical, elliptical, and polygonal.

8. The instrumented heater sleeve according to claim 3, wherein the slot defines a non-constant width along its extended length.

9. An instrumented heater sleeve comprising multiple zones, each zone comprising a pair of lead wires secured to a resistive element layer; the resistive element layer being disposed over a first dielectric layer; the pair of lead wires providing for the application of power to a corresponding one of the zones such that power can be independently supplied to each of the zones to achieve a desired temperature profile.

10. The instrumented heater sleeve according to claim 9 further comprising:

a sleeve upon which the first dielectric layer is disposed;

a second dielectric layer disposed over the resistive element layer; and a protective layer disposed over the second dielectric layer.

11. The instrumented heater sleeve according to claim 9, wherein each zone is approximately 0.25 in. (10mm) in width.

12. The instrumented heater sleeve according to claim 9, wherein the instrumented heater sleeve comprises one selected from the group of a slot or a step-lap interface extending along a length of the instrumented heater sleeve.

13. The instrumented heater sleeve according to claim 9 further comprising a control interface.

14. The instrumented heater sleeve according to claim 10, wherein the instrumented heater sleeve further comprises a strain relief secured to the sleeve and in which the lead wires are crimped.

15. The instrumented heater sleeve according to claim 10, wherein the protective layer is a moisture barrier adapted to seal pores in the underlying layers.

16. The instrumented heater sleeve according to claim 10, wherein the sleeve has a shape selected as one from the group of cylindrical, elliptical, and polygonal.

* * * * *